March 23, 1954     R. B. DAVIS     2,673,114
PIE AND CAKE PAN HANDLE
Filed Aug. 8, 1950
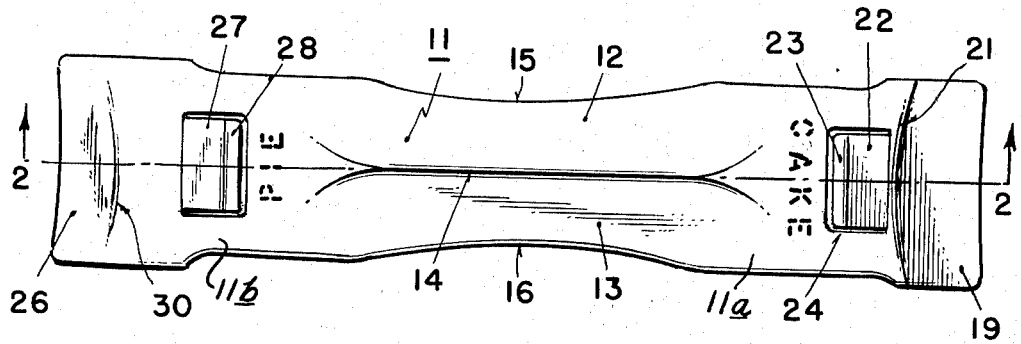
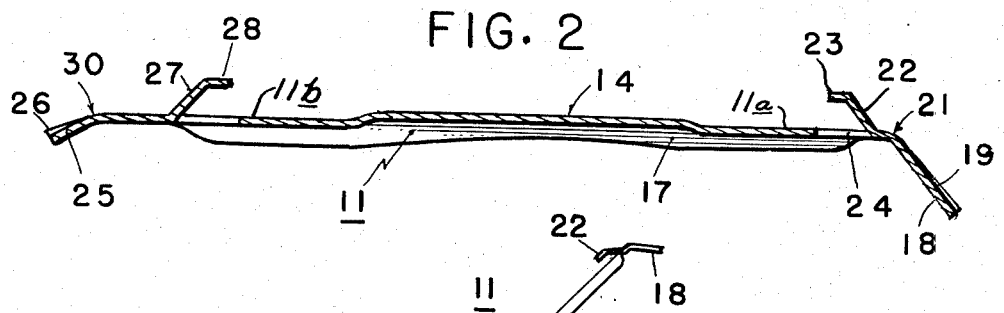
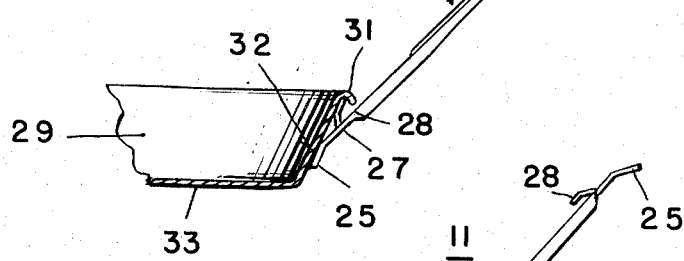
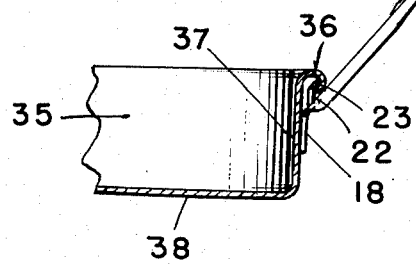
INVENTOR
RALPH B. DAVIS,
BY *Church & Church*
*his* ATTORNEYS Patented Mar. 23, 1954

2,673,114

UNITED STATES PATENT OFFICE 2,673,114

PIE AND CAKE PAN HANDLE

Ralph B. Davis, Prestonsburg, Ky.

Application August 8, 1950, Serial No. 178,309

1 Claim. (Cl. 294—27)

This invention relates to a pan handle and particularly concerns a combination pie and cake pan handle detachably connectable to lift a pan having a vertical or a sloping side and a rolled rim.

Removal of pie and cake pans from a hot oven has long been a problem. While many pan handles have been devised, none have proven successful. Either the handles are cumbersome and awkward to use, or the handles work only with especially mated pans. As a result, most cooks today handle hot pie and cake pans with their hands using only conventional pads known as "pot holders."

A major object of my invention is to provide a simple, economical pan handle which is practical, safe, and easy to manipulate for lifting pie and cake pans of the type now in general use. Another object is to provide such a handle which may be used either with a conventional cake pan having a substantially vertical side or with a conventional pie pan having a sloping side.

In the attainment of these objects, one feature of the invention resides in the arrangement of a pan engaging lip extending downwardly and outwardly from the end of a longitudinal extension of the handgrip to bear against the side of the pan and an inwardly and upwardly extending tongue to enter the rolled rim of the pan. Particularly for use with a pie pan, the tongue is spaced from the juncture of the lip and the extension. Another feature of the invention resides in the provision of lips at both ends of the extensions of the handgrip with one inclined at a greater angle than the other. Tongues at both ends of the extensions of the handgrip have flanges parallel to the extensions, and one tongue is positioned at the juncture of the extension of the handgrip with the lip inclined at the greater angle while the other tongue is spaced from the juncture of the extension of the handgrip and the lip inclined at the lesser angle.

Other objects and advantages of the invention will become apparent from the following specification taken in conjunction with the accompanying drawing wherein Figure 1 is a top plan view of a combination pie and cake pan handle embodying the invention in its preferred form;

Fig. 2 is a longitudinal sectional view taken on the line 2—2 of Fig. 1;

Fig. 3 is a side elevation of the handle shown in Fig. 1 as applied to a pie pan; and Fig. 4 is a similar view showing the handle as applied to a cake pan.

Referring to the drawing, the combination pie and cake pan handle is illustrated as having a handgrip 11 and longitudinal extensions 11a and 11b on each end of the handgrip formed as by stamping, from a suitable metal such as aluminum. Preferably, handle 11 has its top surface formed of oppositely sloping side portions 12 and 13 joined in the center of the handle at a ledge 14. These side portions 12 and 13 have their edges shaped in the form of inwardly extending arcs 15 and 16 to provide a convenient handgrip. Along the entire length of each side of the handgrip, and integral therewith, there extends a depending flange such as the flange 17 shown most clearly in Fig. 2. The meeting lines of the flanges with the top surfaces of the handgrip are rounded to provide a smooth area which is comfortable when held in the hand.

At one end, a cake pan engaging lip 18 extends downwardly and outwardly from the extension 11a of the handgrip 11. Lip 18 has its upper surface 19 of concave formation to fit the cylindrical side wall of the cake pan. At juncture 21 of lip 18 with extension 11a of handgrip 11, a cake pan engaging tongue 22 extends upwardly and inwardly toward the handgrip. At its top, cake pan engaging tongue 22 is formed with a flange 23 extending substantially parallel to the extension 11a of the handgrip in a direction away from lip 18 toward the other end of the handgrip. Tongue 22 and flange 23 are stamped from the body of the extension of the handgrip leaving an aperture 24 in the top thereof.

At its other end extension 11b of the handgrip 11 has a downwardly and outwardly extending pie pan engaging lip 25. Lip 25 has its top surface 26 of concave formation to fit the rounded surface of the side of the pie plate. Spaced inwardly from juncture 30 of the lip 25 with the extension 11b of the handgrip 11 is an upwardly and inwardly extending pie pan engaging tongue 27. At the top of tongue 27, there is a flange 28 extending parallel to the extension 11b of the handgrip 11 away from the pie pan engaging lip 25 toward cake pan engaging lip 18.

Cake pan engaging lip 18 is inclined downwardly at a greater angle of inclination with respect to the extension of handgrip 11 than the angle of inclination of the pie pan engaging lip 25. It has been found that the cake pan engaging lip should be inclined at an angle greater than 45 degrees whereas the pie pan engaging lip 25 should be inclined at an angle of less than 45 degrees with respect to the extensions of the handgrip. It will be noted that cake pan engaging tongue 22 is inclined at about the same angle with respect to the extensions of the handgrip as the angle of inclination of the cake pan engaging lip 18 although the tongue 22 is inclined in the opposite direction. It is important that the pie pan engaging tongue 27 be spaced from the juncture 30 of the pie pan engaging lip 25 with the extension 11b of the handgrip 11 and inclined toward the opposite end of the handgrip in order for the handle to be appropriately positioned when the lip 25 is in engagement with the inclined side of a pie pan.

As illustrated in Fig. 3, when the handle is used to lift a pie pan 29 flange 28 on pie pan engaging tongue 27 enters into rounded rim 31 at the top of inclined side 32 against which pie pan engaging lip 25 bears. It is important to note that the handle may be properly positioned on the pie pan and/or removed therefrom without disturbing the position of the pie pan 29 on the base 33 upon which it rests.

As illustrated in Fig. 4, when the handle is used with a cake pan 35, flange 23 on cake pan engaging tongue 22 enters into rolled rim 36 of the cake pan 35. The concave surface of the cake pan engaging lip 18 bears against the rolled side 37 of the cake pan. Here, again, it will be noted that the handle may be applied to the pan or removed therefrom without disturbing the position of the pan on the base 38 upon which the pan rests.

Although the major purpose of the handle is to remove hot pans from an oven, it will be apparent that the handle may be used at any time to lift the pan. The entire combination pie and cake pan handle is stamped in one operation from a single piece of metal so it is easily manufactured at a minimum of expense. The single unit described and illustrated may be used for a variety of sizes of pie and cake pans. It is unnecessary for the housewife to have more than one handle to lift all of the pans usually used.

What is claimed is:

A detachable handle for a pie pan having a handgrip and pie pan engaging means, said engaging means comprising a longitudinal extension of said handgrip, a concave pan engaging lip integral with and extending downwardly and outwardly from and entirely across the end of said extension to bear against the sloping side of the pie plate, a tongue punched from a central portion of said extension and spaced from the juncture of said lip and said extension inwardly toward said handgrip, said tongue being inclined upwardly and inwardly from the extion, and a flange on the upper end of said tongue extending toward said handgrip and parallel to said extension to enter the rolled rim on the pie pan.

RALPH B. DAVIS.

References Cited in the file of this patent

UNITED STATES PATENTS

| Number | Name | Date |
| --- | --- | --- |
| 446,114 | Ericson | Feb. 10, 1891 |
| 1,134,905 | Prochaska | Apr. 6, 1915 |
| 1,667,973 | Kircher | May 1, 1928 |